United States Patent
Overton et al.

(10) Patent No.: US 8,770,621 B1
(45) Date of Patent: Jul. 8, 2014

(54) VARIABLE ORIFICE CONSTRUCTION

(71) Applicant: ARC Automotive Inc., Knoxville, TN (US)

(72) Inventors: Douglas Earl Overton, Knoxville, TN (US); James Michael Rose, Knoxville, TN (US); Rebekah Lyn Locke Reid, Lenoir City, TN (US)

(73) Assignee: ARC Automotive Inc., Knoxville, TN (US)

( * ) Notice: Subject to any disclaimer, the term of this patent is extended or adjusted under 35 U.S.C. 154(b) by 0 days.

(21) Appl. No.: 13/777,082

(22) Filed: Feb. 26, 2013

(51) Int. Cl.
*B60R 21/274* (2011.01)

(52) U.S. Cl.
USPC ............................. 280/737; 280/736; 280/741

(58) Field of Classification Search
USPC ....................... 280/741, 737, 736, 740; 222/3
See application file for complete search history.

(56) References Cited

U.S. PATENT DOCUMENTS

| | | | | |
|---|---|---|---|---|
| 5,131,680 A * | 7/1992 | Coultas et al. | ................ | 280/737 |
| 5,213,362 A * | 5/1993 | Coultas | ......................... | 280/736 |
| 5,226,667 A * | 7/1993 | Coultas | ......................... | 280/734 |
| 5,820,162 A | 10/1998 | Fink | | |
| 6,106,002 A | 8/2000 | Haesaert et al. | | |
| 6,497,431 B1 | 12/2002 | Schramm | | |
| 6,702,323 B2 * | 3/2004 | Goetz | ........................ | 280/736 |
| 7,007,610 B2 * | 3/2006 | Karlin et al. | .................. | 102/531 |
| 7,243,948 B2 | 7/2007 | Aranzulla et al. | | |
| 7,398,996 B2 | 7/2008 | Saito et al. | | |
| 7,780,193 B2 * | 8/2010 | Hayakawa et al. | ........... | 280/741 |
| 7,938,443 B1 * | 5/2011 | Smith | ........................ | 280/736 |
| 8,517,420 B2 * | 8/2013 | Fischer | ........................ | 280/736 |
| 2009/0243269 A1 | 10/2009 | Braun et al. | | |

* cited by examiner

*Primary Examiner* — Drew Brown
(74) *Attorney, Agent, or Firm* — Nixon & Vanderhye PC

(57) ABSTRACT

A pressure vessel for an air bag inflator. The pressure vessel has a portion that is deformable by internal pressure resulting from combustion of gas generant therein. The deformable portion of the pressure vessel has at least one exit orifice therein. Upon deformation of the pressure vessel portion by internal pressure, the size of the exit orifice is increased to expedite the release of pressurized combustion gas from the pressure vessel.

7 Claims, 4 Drawing Sheets

VARIABLE ORIFICE CONSTRUCTION

BACKGROUND OF THE INVENTION

1. Field of the Invention

The present invention relates to a pressure vessel for an air bag inflator or the like and, more particularly, to such a pressure vessel having one or more exit orifices that are adjustable in response to deformation of the pressure vessel.

2. Description of the Background Art

In the prior art, many different types of devices have been used to control the size of exit orifices in a pressure vessel for an air bag inflator or the like for the purpose of controlling the pressure in the pressure vessel. Some examples of such devices are slidable valves, pressure relief valves, movable spools, fabric layers and rupture members. All of these devices have added to the cost and size of air bag inflators and have been subject, in some cases, to improper operation and maintenance problems.

There is a need, therefore, for a new and improved method of controlling the size of such exit orifices. The present invention meets this need.

BRIEF SUMMARY OF THE INVENTION

In accordance with the present invention, the pressure vessel is constructed to deform in a predetermined manner in response to internal pressure in the pressure vessel and such deformation results in an increased size of one or more exit orifices in the present vessel.

Preferably, the pressure vessel is made of a high tensile strength material that has a high or low yield strength. In the case of high yield strength, the enlarged exit orifices will return to their original size without plastic deformation after release of the pressure in the pressure vessel. In the case of low yield strength, the enlarged exit orifices may not return to their original size because of some plastic deformation of the pressure vessel in the area of the exit orifices. A limited amount of such plastic deformation may be acceptable for certain purposes if it does not result in improper combustion of the gas generant in the pressure vessel.

The present invention controls the size of the exit orifices in response to the deformation of the pressure vessel and does not require any other devices for controlling the size of the exit orifices. Accordingly, it is simple and reliable in operation. For air bag inflator pressure vessels, HSLA steels are typically used owing to their balance of availability, performance, cost and weldability. Depending on the shape of the components, material properties and load, a specific thickness and/or shape will be required. For air bag inflators, the gas generant and orifice area will determine the basic operating/combustion pressure. Different generant types operate at different pressures (3,500-7,000 psi) depending on formulation. This means that a pressure vessel with a different gas generant but the same package size will require very different thicknesses to ensure the same structural integrity or deformation to vary the size of the exit orifice or orifices.

DETAILED DESCRIPTION OF THE INVENTION

Referring to FIG. 1(a), there is shown a portion of a pressure vessel 10 for an air bag or the like that is constructed to be deformed by internal pressure within the pressure vessel as a result of the combustion of the gas generant therein. The pressure vessel 10 comprises at least one exit orifice 12 in a deformable portion thereof.

Figure 1:
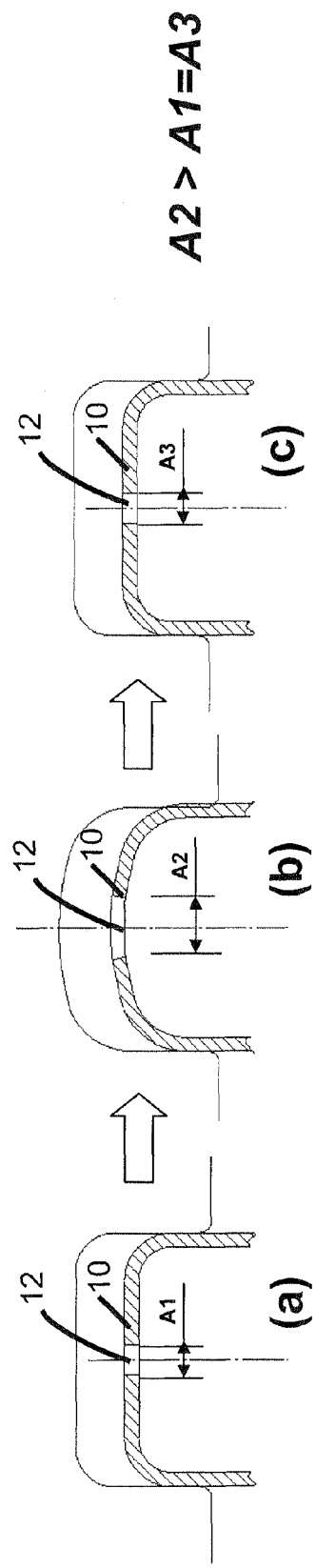
FIG. 1 is a schematic view of a portion of one embodiment of a pressure vessel having a high yield strength, showing a sequence of steps in the enlargement of the exit orifice in response to deformation of the pressure vessel by internal pressure.

In the embodiment of FIG. 1, the pressure vessel 10 preferably is formed of a high tensile strength material such as HSLA steel that has a high yield strength between about 70-90 ksi (500-700 Mpa). Accordingly, when the pressure vessel is subjected to internal pressure from the combustion of the gas generant therein, it will be deformed outwardly to the position shown in FIG. 1(b) wherein the size of the exit orifice 12 is increased to expedite the release of pressure within the pressure vessel.

Upon the release of pressure in the pressure vessel 10, it returns to its original shape as shown in FIG. 1(c) wherein the exit orifice 12 returns to its original size because of the high yield strength of the pressure vessel material. In this manner, the size of the exit orifice 12 is increased without the need for any other device for controlling the size of the orifice.

Figure 2:
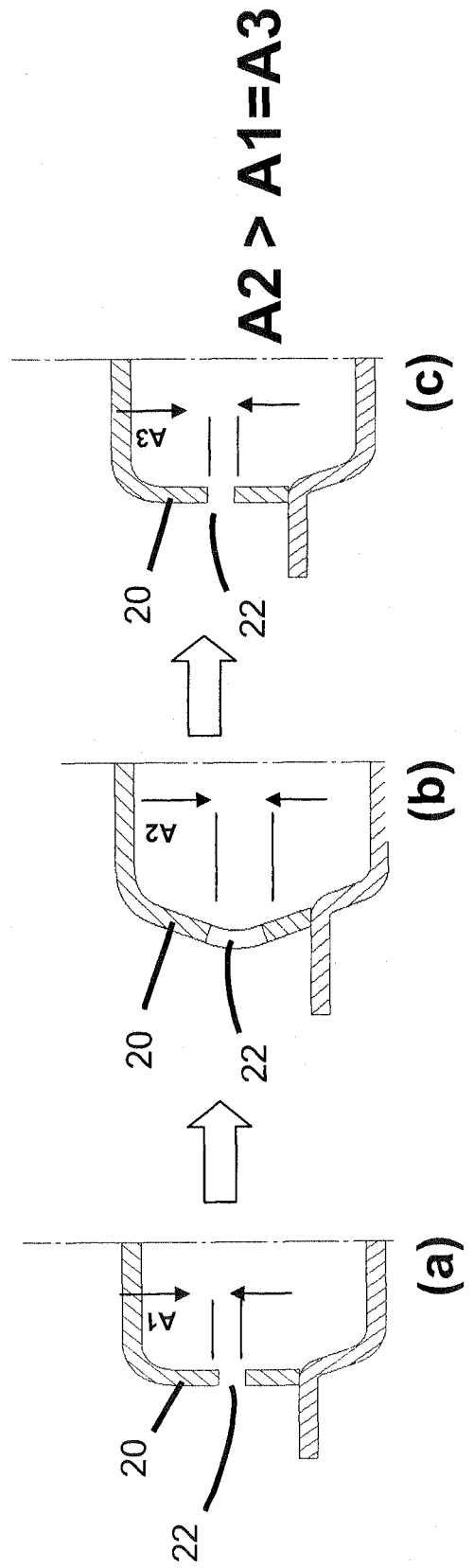
FIG. 2 is a schematic view of a portion of a second embodiment of a pressure vessel having a high yield strength, showing a sequence of steps in the enlargement of the exit orifice in response to deformation of the pressure vessel by internal pressure.

Similarly, as shown in FIG. 2, the deformable portion of the pressure vessel 20 comprises at least one exit orifice 22 that is enlarged by the deformation of the pressure vessel 20 owing to internal pressure therein from combustion of the gas generant, as shown in FIG. 2(b). Thereafter, upon release of the pressure within the pressure vessel 20, it returns to its original shape wherein the exit orifice 22 returns substantially to its original size as shown in FIG. 2(c). In the embodiment of FIG. 2, the pressure vessel 20 is formed of a high tensile strength material having a high yield strength like the pressure vessel 10 in FIG. 1.

As an illustrative example, the specifications for the material of the pressure vessels 10 and 20 and the thickness of the deformable portion of the pressure vessels 10 and 20 are as follows:

| Internal Pressure | Material SAEJ2340 Minimum Yield Strength | Wall Thickness (mm) |
| --- | --- | --- |
| 8,000 psi | 550 Mpa | 2.6 |
| 8,000 psi | 700 Mpa | 2.3 |
| 4,000 psi | 550 Mpa | 1.5 |
| 4,000 psi | 700 Mpa | 1.2 |

Referring to the specifications in the above chart, the internal pressure represents the peak combustion pressure during the inflator operation. Depending on the gas generant type, this can vary greatly between approximately 3,000-8,000 psi. Different gas generants operate at lower pressures and thus would allow reduction in material thickness compared to generants that operate at higher pressures.

It is noted, therefore, that the above-identified exemplary specifications will vary depending on the anticipated internal pressure within the pressure vessel as a result of the combustion of the gas generant therein.

Figure 3:
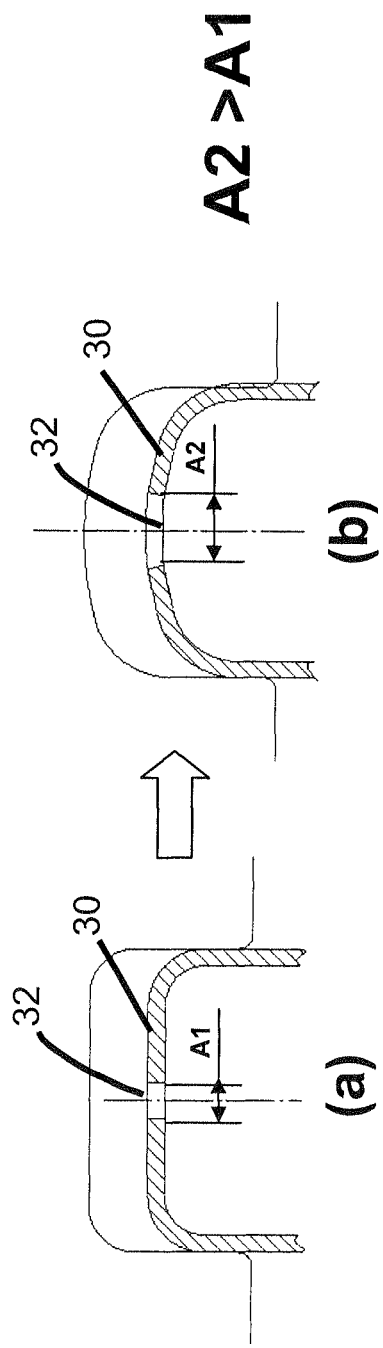
FIG. 3 is a schematic view similar to FIG. 1 showing the enlargement of the exit orifice in response to deformation of a pressure vessel having a low yield strength.
Figure 4:
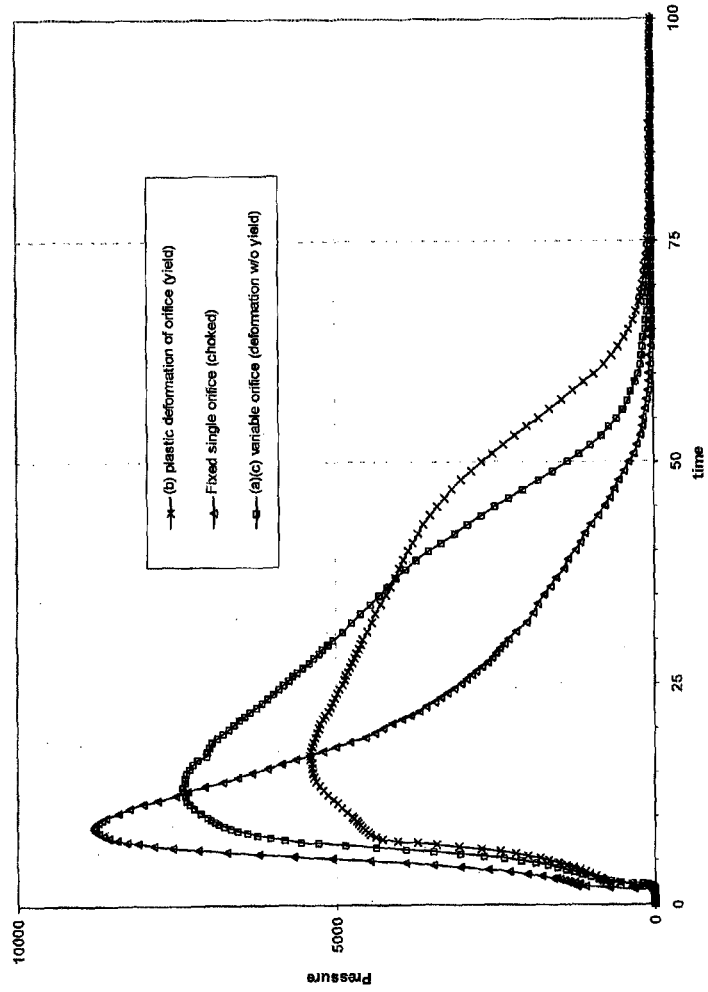
FIG. 4 is a graph of pressure v. time for a fixed choked exit orifice, an exit orifice enlarged by the deformation of a pressure vessel of high yield strength material and an exit orifice enlarged by the deformation of a pressure vessel of low yield strength material.

FIG. 3 illustrates a deformable portion of a pressure vessel 30 having an exit orifice 32 therein. The pressure vessel 30 is formed of a high tensile strength material, e.g., HSLA steel, having a low yield strength. Accordingly, upon deformation of the pressure vessel by internal pressure as shown in FIG. 3(*b*), the exit orifice 32 is enlarged and does not return to its original size because of the plastic deformation of the low yield strength material. A limited amount of such plastic deformation may be acceptable for the operation of the inflator so long as it does not result in improper combustion of the gas generant in the pressure vessel.

As an illustrative example, the specifications for the material of the pressure vessel 30 and the thickness of the deformable portion thereof are as follows:

| Internal Pressure | Material Specification | Wall Thickness (mm) |
|---|---|---|
| 8,000 psi | AISI 1008 | 3 |
| 8,000 psi | AISI 1015 | 2.9 |
| 8,000 psi | AISI 1020 | 2.7 |

Referring to the above chart, different steels have similar deflection under the same load. For a given pressure, however, the tensile strength must be compensated by increasing thicknesses. Accordingly, the higher yield material offers greater deflection due to reduced thickness, less permanent deformation and weight reduction, and thus is generally a better option. A preferred material, therefore, is HSLA steel with a minimum yield strength of 550-700 Mpa (70-90 ksi).

It is again noted, therefore, that the specifications for the pressure vessel 30 will vary depending on the anticipated internal pressure therein as a result of combustion of the gas generant.

From the foregoing description, it is apparent that the size of the exit orifices 12, 22 and 32 in the pressure vessels 10, 20 and 30, respectively, are controlled by the deformation of the pressure vessel by the internal pressure therein resulting from the combustion of the gas generant, without requiring any other device for adjusting the size of the exit orifice. This is a simple construction that is predictable and reliable in operation at minimal cost.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A pressure vessel for an air bag inflator, the pressure vessel being formed of a material that is deformable by internal pressure therein resulting from the combustion of gas generant therein, the pressure vessel comprising at least one open and unobstructed exit orifice therein that is defined by a surrounding peripheral portion of the pressure vessel, whereby upon deformation of the pressure vessel by internal pressure the peripheral portion is expanded to increase the size of the exit orifice to expedite the release of pressurized combustion gas from the pressure vessel.

2. The pressure vessel of claim 1 wherein the pressure vessel is formed of a high tensile strength material.

3. The pressure vessel of claim 2 wherein the pressure vessel material has a high yield strength so that the exit orifice returns to its original size after release of the internal pressure within the pressure vessel.

4. The pressure vessel of claim 3 wherein the pressure vessel is formed of HSLA steel with a minimum yield strength of 70-90 ksi (500-700 Mpa).

5. The pressure vessel of claim 2 wherein the pressure vessel material has a low yield strength so that the exit orifice retains an increased size after release of the internal pressure within the pressure vessel owing to plastic deformation of the pressure vessel material.

6. The pressure vessel of claim 1 wherein the pressure vessel is formed of HSLA steel.

7. The pressure vessel of claim 1 wherein the pressure vessel has a thickness of approximately 1.5 mm to 2.5 mm, and is constructed to deform when subjected to an internal pressure of approximately 6,000 to 12,000 psi.

\* \* \* \* \*